US010901969B2

(12) United States Patent
Weber

(10) Patent No.: US 10,901,969 B2
(45) Date of Patent: Jan. 26, 2021

(54) SYSTEM AND METHOD FOR FACILITATING AN OBJECTIVE-ORIENTED DATA STRUCTURE AND AN OBJECTIVE VIA THE DATA STRUCTURE

(71) Applicant: Development Guild DDI, Inc., Brookline, MA (US)

(72) Inventor: Matthew Weber, Montclair, NJ (US)

(73) Assignee: Development Guild DDI, Inc., Brookline, MA (US)

( * ) Notice: Subject to any disclaimer, the term of this patent is extended or adjusted under 35 U.S.C. 154(b) by 212 days.

(21) Appl. No.: 16/103,311

(22) Filed: Aug. 14, 2018

(65) Prior Publication Data

US 2020/0057817 A1    Feb. 20, 2020

(51) Int. Cl.
| G06F 16/00 | (2019.01) |
| G06F 16/22 | (2019.01) |
| G06N 3/08  | (2006.01) |
| G06F 16/23 | (2019.01) |

(52) U.S. Cl.
CPC ...... *G06F 16/2246* (2019.01); *G06F 16/2379* (2019.01); *G06N 3/08* (2013.01)

(58) Field of Classification Search
CPC .... G06F 16/2246; G06F 16/2379; G06N 3/08
See application file for complete search history.

(56) References Cited

U.S. PATENT DOCUMENTS

| 8,195,691 | B2* | 6/2012 | Flynn | G06F 16/2428 |
| | | | | 707/778 |
| 8,392,153 | B2* | 3/2013 | Pednault | G06K 9/6219 |
| | | | | 703/2 |
| 8,984,022 | B1* | 3/2015 | Crawford | G06Q 40/08 |
| | | | | 707/803 |
| 9,529,836 | B1* | 12/2016 | Hale | G06F 16/2237 |
| 9,588,956 | B2* | 3/2017 | Seneski | G06F 8/37 |
| 9,684,874 | B2* | 6/2017 | Cichosz | G06N 5/003 |
| 2003/0167265 | A1* | 9/2003 | Corynen | G06Q 10/04 |

(Continued)

FOREIGN PATENT DOCUMENTS

KR    10-2016-0031519 A    3/2016

OTHER PUBLICATIONS

International Search Report and Written Opinion issued in corresponding International Patent Application No. PCT/US2019/045816 dated Nov. 21, 2019 (9 pages).

*Primary Examiner* — Jean M Corrielus
(74) *Attorney, Agent, or Firm* — Pillsbury Winthrop Shaw Pittman LLP

(57) ABSTRACT

In some embodiments, a hierarchical tree may include nodes that each indicates an objective, and each non-root node of the nodes indicates an objective supporting an objective of at least one node with which the non-root node has a direct relationship. Based on a modification to an objective of a given node of the tree, a determination of whether at least one child node of the given node indicates an unsatisfiable objective (e.g., no longer suitably supporting the given node's objective). For a child node of the given node determined to indicate an unsatisfiable objective, a corresponding subset of the tree may be replaced with replacement nodes that each indicates a satisfiable objective (e.g., suitably supporting the given node's objective), where the corresponding subset includes (i) the child node and (ii) descendant nodes of the child node.

20 Claims, 6 Drawing Sheets

(56) References Cited

U.S. PATENT DOCUMENTS

| | | | |
|---|---|---|---|
| 2004/0015486 A1* | 1/2004 | Liang | G06F 16/9024 |
| 2006/0161569 A1* | 7/2006 | Meyer | G06F 16/2246 |
| 2007/0055558 A1* | 3/2007 | Shanahan | G06Q 10/06316 |
| | | | 705/7.26 |
| 2009/0030864 A1* | 1/2009 | Pednault | G06K 9/6282 |
| | | | 706/45 |
| 2011/0153666 A1* | 6/2011 | Flynn | G06F 16/2455 |
| | | | 707/779 |
| 2012/0023209 A1* | 1/2012 | Fletcher | H04L 12/40195 |
| | | | 709/223 |
| 2015/0019576 A1* | 1/2015 | Seneski | G06F 8/37 |
| | | | 707/755 |
| 2015/0032674 A1* | 1/2015 | Cichosz | G06F 16/2246 |
| | | | 706/12 |
| 2015/0229698 A1* | 8/2015 | Swan | G06Q 10/101 |
| | | | 709/203 |
| 2016/0267397 A1* | 9/2016 | Carlsson | G06N 5/025 |
| 2018/0025093 A1* | 1/2018 | Xia | G06F 16/90335 |
| | | | 707/602 |

\* cited by examiner

SYSTEM AND METHOD FOR FACILITATING AN OBJECTIVE-ORIENTED DATA STRUCTURE AND AN OBJECTIVE VIA THE DATA STRUCTURE

FIELD OF THE INVENTION

The invention relates to facilitating an objective-oriented data structure and an objective via the data structure.

BACKGROUND OF THE INVENTION

With the influx of mobile and ubiquitous devices, technologies for collecting data from users and their devices have flourished. As an example, crowdsourcing systems can facilitate the sourcing of services from a more public crowd to provide software modules or other data (e.g., answers or other submissions related to task requests). Such crowdsourcing technologies often provide improved costs, speed, quality, flexibility, scalability, or diversity. However, when one or more objectives (or sub-objectives thereof) of a crowdsourced project change, typical crowdsourcing systems must generally restart and repeat all of the processes with respect to the changed objectives/sub-objectives, such as generating sending new tasks, transmitting the new tasks to a large number of individuals, collecting the data from the individuals, and processing all of the data and generating further tasks (and repeating one or more of the foregoing). Thus, in addition to modification-related delays from the need for the individual to provide the requested data, crowdsourcing systems typically re-expend a similar amount of computational resources (e.g., processing power, memory, network resources, etc.) to repeat all of the processes performed for a prior objective to accomplish the modified objective. These and other drawbacks exist.

SUMMARY OF THE INVENTION

Aspects of the invention relate to methods, apparatuses, and/or systems for facilitating an objective-oriented data structure and an objective via the data structure.

In some embodiments, when a modification of a node of a graph is detected, a corresponding subset of the graph may be modified. Such corresponding subset may include (i) one or more nodes having a direct relationship to the node (e.g., child nodes of the node), (ii) one or more nodes having an indirect relationship to the node (e.g., grandchild nodes of the node, great grandchild nodes of the node, etc.), or (iii) other nodes, edges, or aspects of the graph. As an example, a connected node (having a direct relationship with the node) may include a definition indicating an objective, and the connected node's definition may be determined to be unsatisfiable where (i) the connected node's objective is determined to be incompatible with the modified node's objective, or (ii) the connected node's objective is determined to no longer support the modified node's objective (e.g., the connected node's objective no longer suitably supports the modified objective such that accomplishing the connected node's objective would not deemed to be furthering the modified objective).

In some embodiments, when the modification of the node is detected, the corresponding graph subset that is modified may include (i) the connected node and (ii) one or more indirectly connected nodes (having an indirect relationship with the node), and such modification of the graph subset may be performed without regard to whether all (or any) of such indirectly-connected nodes have an unsatisfiable definition. In some embodiments, the corresponding graph subset that is modified may include (i) the connected node and (ii) one or more other connect nodes having a direct relationship with the node that has been modified, and such modification of the graph subset may be performed without regard to whether all (or any) of such other connected nodes have an unsatisfiable definition. In some embodiments, the corresponding graph subset that is modified may include (i) the connected node, (ii) one or more other connect nodes having a direct relationship with the node that has been modified, and (iii) one or more indirectly connected nodes having an indirect relationship with the node, and such modification of the graph subset may be performed without regard to whether all (or any) such nodes (e.g., the connected node, the other connect nodes, the indirectly-connected nodes, etc.) have an unsatisfiable definition.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
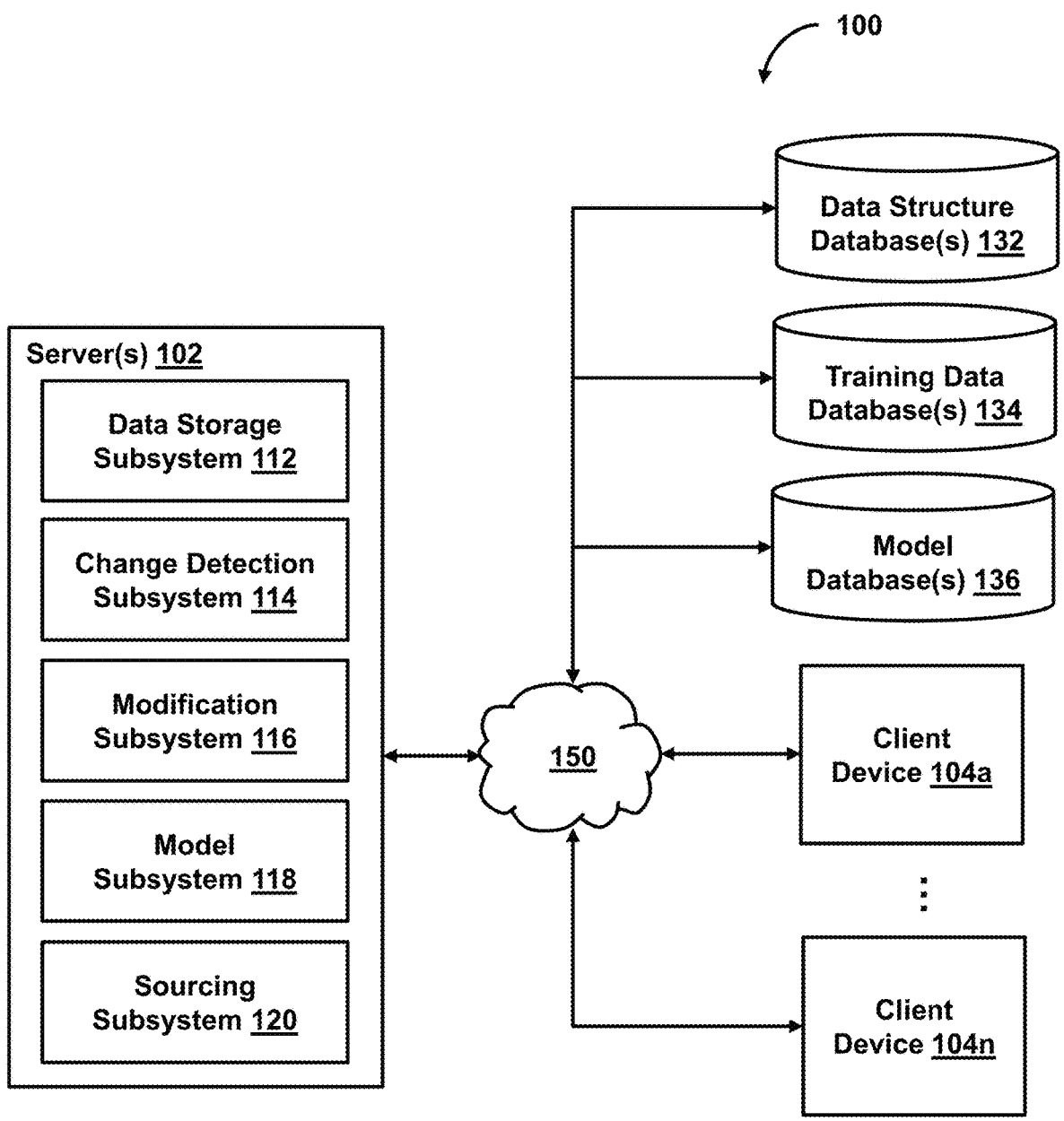
FIG. 1 shows a system for facilitating an objective-oriented data structure and an objective via the data structure, in accordance with one or more embodiments.

FIG. 1 shows a system 100 for facilitating an objective-oriented data structure and an objective via the data structure, in accordance with one or more embodiments. As shown in FIG. 1, system 100 may include server(s) 102, client device 104 (or client devices 104a-104n), or other components. Server 102 may include data storage subsystem 112, change detection subsystem 114, modification subsystem 116, model subsystem 118, sourcing subsystem 120, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Figure 2A:
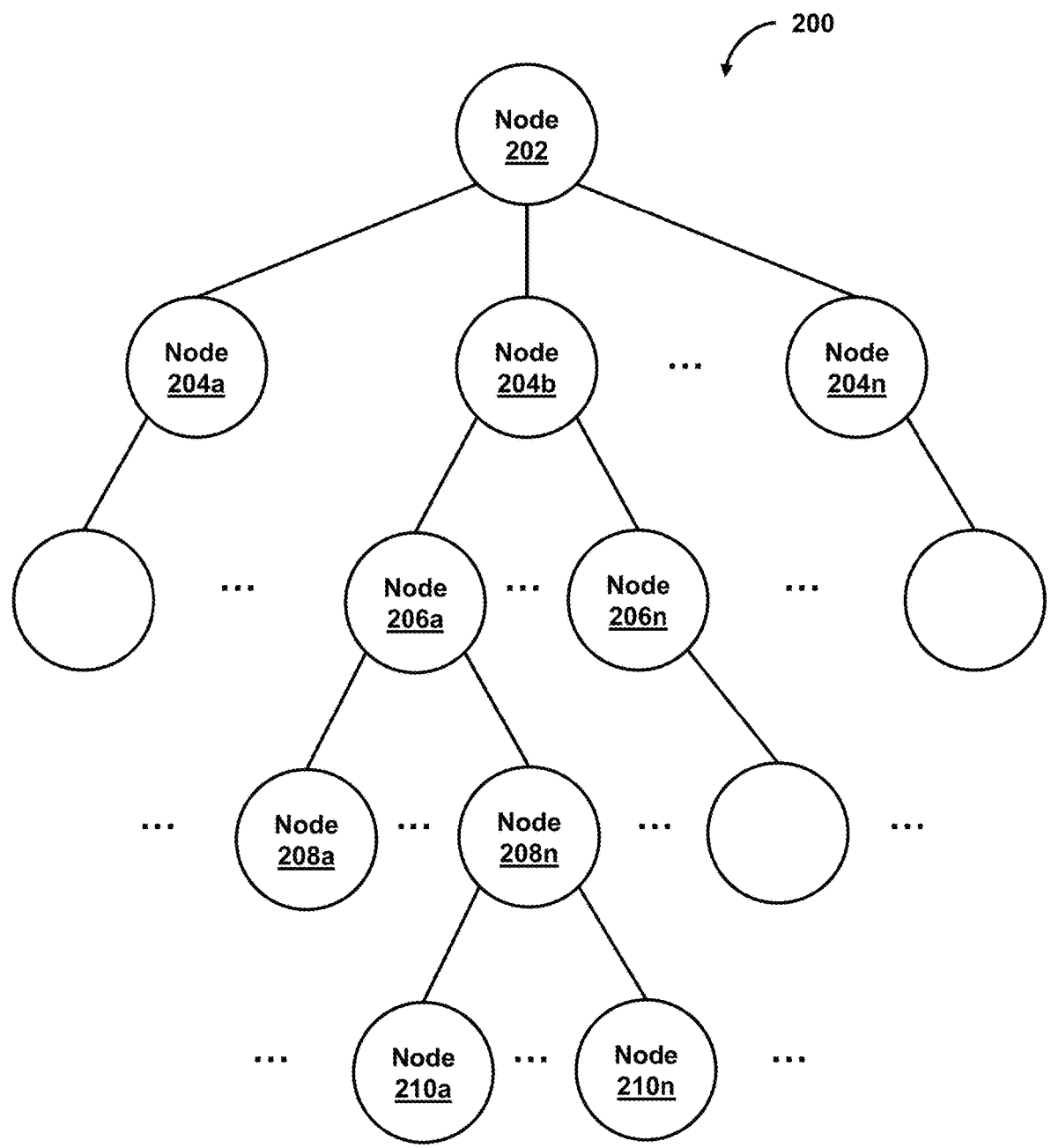
FIGS. 2A-2B respectively show a tree prior to modification of a tree subset and an updated tree subsequent to the tree subset modification, in accordance with one or more embodiments.
Figure 2B:
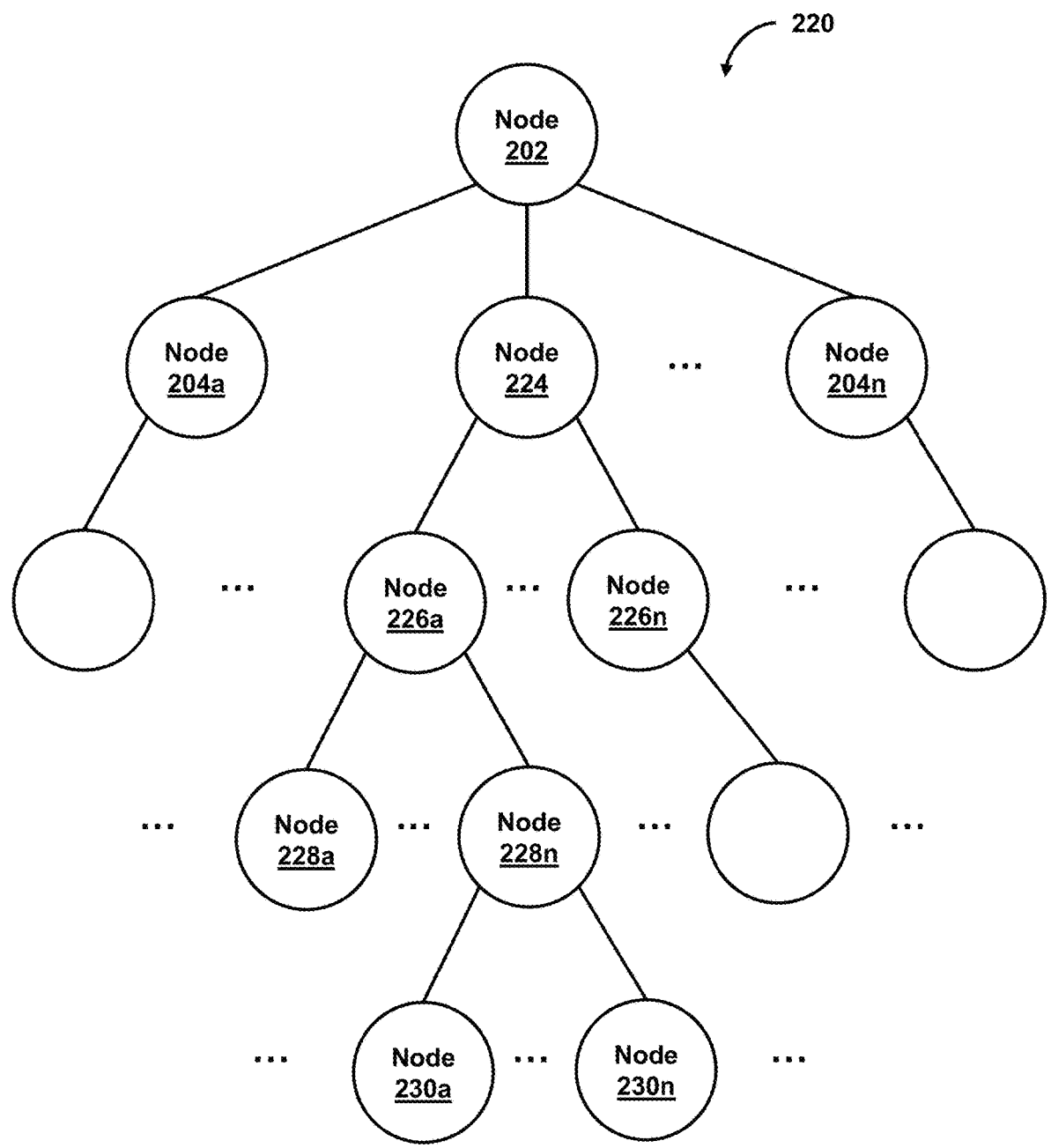

In some embodiments, when a modification of a node of a graph is detected, system 100 may cause modification of a corresponding subset of the graph, such as (i) one or more nodes having a direct relationship to the node (e.g., child nodes of the node), (ii) one or more nodes having an indirect relationship to the node (e.g., grandchild nodes of the node, great grandchild nodes of the node, etc.), or (iii) other nodes, edges, or aspects of the graph. In some embodiments, system 100 may cause modification of the graph by replacing the corresponding subset of the graph with one or more replacement nodes. Such replacement nodes may include (i) instances of nodes of a previously-generated graph (e.g., stored in data structure databases 132), (ii) nodes derived from those of a previously-generated graph (e.g., nodes provided by a neural network or other prediction model based on the modified node and the nodes of the previously-generated graph), or (iii) other replacement nodes. As an example, the graph (e.g., a tree or other graph) may be represented by a set of nodes and an adjacency list of edges between nodes. As another example, the graph may be defined recursively as a collection of nodes where each node is a data structure includes a value and a list of references to nodes (to which the node is directly connected). In one use case, with respect to FIG. 2A, a tree 200 may include nodes 202, 204, 206, 208, 210, or other nodes and relationships between such nodes (e.g., as shown by lines connecting the nodes in FIG. 2A). When a modification to node 204b is detected (e.g., to a modified version represented by node 224 in FIG. 2B), a subset of tree 200 (that includes nodes 206, 208, and 210) may be modified to include nodes 226, 228, and 230 as shown in FIG. 2B.

In some embodiments, when the modification of the node is detected, system 100 may assess one or more connected nodes having a direct relationship with the node to determine whether at least one such connected node has an unsatisfiable definition with respect to the modified node. As an example, a connected node may include a definition indicating an objective, and the connected node's definition may be determined to be unsatisfiable where (i) the connected node's objective is determined to be incompatible with the modified node's objective, or (ii) the connected node's objective is determined to no longer suitably support the modified node's objective. If a connected node has an unsatisfiable definition, system 100 may cause modification of a corresponding subset of the graph such that each node of the modified graph subset has a satisfiable definition with respect to the modified node. As an example, the corresponding subset of the graph may include (i) the connect node, (ii) one or more other connected nodes having a direct relationship with the node, (iii) one or more nodes having an indirect relationship with the node (e.g., grandparent nodes of the node, grandchild nodes of the node, nodes more than one degree of connections from the node, etc.), or (iv) other nodes, edges, or aspects of the graph. In some embodiments, system 100 may cause modification of a corresponding graph subset that includes (i) the connected node and (ii) one or more indirectly connected nodes (having an indirect relationship with the node) without regard to whether all (or any) such indirectly-connected nodes have an unsatisfiable definition. As an example, even if an indirectly connected node has a satisfiable definition with respect to the modified node, system 100 may still modify or replace the indirectly connected node responsive to a determination that the connected node has an unsatisfiable definition or one or more of the other indirectly connected nodes have an unsatisfiable definition. In this way, for example, system 100 may reduce computational resource usage by avoiding the assessment of at least one indirectly connected node or not performing the assessment on any of the indirectly connected nodes (that are nevertheless modified or replaced).

In some embodiments, system 100 may cause modification of a corresponding graph subset that includes (i) the connected node and (ii) one or more other connect nodes having a direct relationship with the node that has been modified, without regard to whether all (or any) of such other connected nodes have an unsatisfiable definition. As an example, even if one of the other connected nodes has a satisfiable definition with respect to the modified node, system 100 may still modify or replace this other connected node responsive to a determination that the connected node has an unsatisfiable definition. As another example, even if one of the other connected nodes has a satisfiable definition with respect to the modified node, system 100 may still modify or replace this other connected node responsive to a determination that one or more indirectly connected nodes (having an indirect relationship with the modified node) have an unsatisfiable definition. As such, for example, system 100 may reduce computational resource usage by avoiding the assessment of at least one directly connected node or not performing the assessment on any of the directly connected nodes (that are nevertheless modified or replaced).

In some embodiments, system 100 may cause modification of a corresponding graph subset that includes (i) the connected node, (ii) one or more other connect nodes having a direct relationship with the node that has been modified, and (iii) one or more indirectly connected nodes having an indirect relationship with the node without regard to whether all (or any) of such other connected nodes or indirectly-connected nodes have an unsatisfiable definition. As described below, in many circumstances, when a given node is modified, it is likely that nodes directly or indirectly connected nodes (e.g., child or other decedent nodes of the given node) no longer have a satisfiable definition. Thus, in such circumstances, system 100 may reduce computational resource usage by avoiding the assessment for one or more of the directly or indirectly connected nodes (e.g., one, some, or all of such nodes) regarding whether they have a satisfiable or unsatisfiable definition. In this way, for example, system 100 may improve the efficiency and speed at which data may be derived from one or more sources (e.g., user input provided at user devices, data stored in databases, data computed by other systems, etc.), as compared with traditional sourcing systems (or other prior systems).

In addition, as discussed above, when a prior objective is modified, crowdsourcing systems typically re-expend a similar amount of computational resources to repeat all of the processes performed for the prior objective to accomplish the modified objective. Such objective modifications may also cause significant delays for traditional crowdsourcing systems because such crowdsourcing systems typically must wait to obtain requested data from one or more sources (e.g., individual users). In some embodiments, system 100 may eliminate one or more of the processes performed for a prior objective (or reduce the amount of computational resources to perform one or more such processes) when facilitating data collection or determination for the modified objective, as described herein.

In some embodiments, a collection of graphs generated (or other data obtains) via crowdsourcing or other graphs (e.g., generated via non-crowdsourcing techniques) may be stored in one or more databases (e.g., databases 132). System 100 may utilize the stored graphs to determine nodes, relationships, or other data for a given graph. In some use cases, one or more processes typically performed to collect data related to one or more tasks via crowdsourcing may be avoided or reduced, thereby reducing the amount of computation resources for such processes to build a graph representation of certain data derived from the crowd-sourced data.

In some embodiments, system 100 may facilitate training of one or more prediction models to generate predictions related to one or more tasks (e.g., related to an objective), results of tasks, nodes, relationships between the nodes, graph subsets, or graphs (e.g., related to the objective), or other data. As described herein, system 100 may utilize such predictions to improve the efficiency and speed at which data may be derived from one or more sources. In some embodiments, such training may cause a prediction model to update one or more of its configurations (e.g., weights, biases, or other parameters). The prediction models may include neural networks, other machine learning models, or other prediction models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, sourcing subsystem 120 may facilitate crowdsourcing of data via generation of one or more types of tasks. As an example, sourcing subsystem 120 may generate one or more tasks requesting user input related to an objective (e.g., finding solutions to a large problem or other objective). Large problems may, for example, be "atomized" into thousands of pieces (or other number of pieces) and transmitted as individual tasks to individual users. At least some of the data (e.g., obtained from the users in response to the thousands of tasks) may be automatically assembled into a data graph (e.g., a hierarchical tree of data or other data graph). In one scenario, an application may recursively build a tree of data with a few types of tasks sent to human workers. Examples of such types of tasks include a creation task, a voting task, an "atomize" task, or other tasks. The creation task may request that a user to fill in the steps on how to accomplish an objective in seven steps or less (or other number of steps). The voting task may request that a user vote on the quality of one or more of the results produced in response to the create task. As an example, the user may be requested to (i) select the best submission from the submissions obtained from individuals sent the create task, (ii) rank the submissions indicating the quality of each submission, or (iii) performing one or more other voting techniques. The submission with the highest votes or greatest average ranking may be selected as the chosen answer for accomplishing the objective. The "atomize" task may request that a user to identify which steps (e.g., objectives to accomplish the primary objective) should require further sub-steps (e.g., sub-objectives to the objectives supporting the primary objective). Based on at least a threshold of users (e.g., one user or other designated threshold number of users) indicating that a particular step should be further expanded upon (e.g., require further sub-steps), another round of the three types of tasks may be iterated for the step. In one scenario, the create task may be sent to 50 users, the voting task may be sent to 20 users, and the atomize task may be sent to 20 users. In another scenario, the various tasks may be sent out to other number of users.

In one use case, the following example represents a tree generated via the foregoing iterative crowdsourcing algorithm, where the tree includes a root node indicating an objective of making the United States energy independent (e.g., "how to make the US energy independent") (or an objective of listing steps to make the United States energy independent), where the child nodes of the root node indicate objectives related to the steps 1-7 below, the child nodes of those child nodes (or the grandchild nodes of the root nodes) indicate objectives related to respective sets of steps a-g below, and so on. With respect to the tree, steps 1.a., 1.b.ii, 1.b.iii, 1.c, 1.d, 1.e, and 1.f may be represented by leaf nodes of the tree (e.g., the example steps below without an immediately following ellipsis indicator).

1. Begin by using less oil
   a. Continue cash for clunkers program to eliminate gas hogs from the road
   b. Expand public transit systems nationally
     i. Provide government funds to support efforts of communities that present viable public transit system plans
     ii. Encourage employers to provide free passes for public transit systems to employees iii. Study alternative models of public transit, such as "pick-up on demand" used in some communities for senior citizens iv. Convene a meeting among those responsible for community public transit systems intended to share "best practices" and brainstorm solutions v. Study successful public transit systems from other countries (London, Paris, Russia, Tokyo, etc.)

vi. Consider more frequent service that accommodates a smaller number of people (rather than longer trains and buses)

vii. Reinvigorate rail travel, applying the successful Amtrak/Acela systems from the East Coast to other regions c. Provide incentives for hybrid car buyers d. Encourage energy efficient development (city vs. suburb)

e. expand education programs teaching kids about oil and energy conservation f. subsidize the creation of more energy efficient vehicles g. encourage telecommuting and 4-day work weeks 2. Build our own oil output to maximum capacity (drill)

3. Utilize clean coal

4. Investigate and utilize natural gas and hydro-electric (water)

5. Investigate and develop solar energy

6. Investigate and develop wind energy

7. Build plenty of nuclear plants

In another use case, software development may be performed via crowdsourcing, and the following example represents a tree related to development of a software application (e.g., a tree including references to source code, a tree including references to technical specifications, etc.). As an example, a root node of the tree may indicate an objective of developing a specific type of software application (e.g., "help us make a math application to teach junior high level algebra to junior high school students"). The child nodes of the root node may indicate objectives related to developing technical specification of the math application. The descendant nodes of those child nodes may indicate objectives related to more granular technical specifications or source code.

In some embodiments, data storage subsystem 112 may store nodes of a graph, relationships between the nodes (e.g., the nodes' direct connections with one another such as edges shared between the nodes, the node's indirect connections with one another, etc.), or other aspects of the graph. Change detection subsystem 114 may detect a modification to an objective of a given node of the graph, and, based on the detected modification, modification subsystem 116 may determine one or more child nodes of the given node. For at least one of the child nodes, modification subsystem 116 may cause modification of a corresponding subset of the graph such that the modified graph subset includes nodes that each indicates an objective supporting the objective of the given node. The corresponding subset may include (i) the child node, (ii) one or more other child nodes of the given node, (iii) one or more descendant nodes of the child node or the other child nodes, or (iv) other nodes, edges, or aspects of the graph. As an example, each of the nodes may indicate an objective, and each non-root node of the nodes may indicate an objective supporting an objective of at least one node with which the non-root node has a direct relationship. Additionally, or alternatively, each of the non-root nodes may indicate at least one node whose objective the non-root node's objective is intended to support (e.g., by including an identifier of such node whose objective is intended to be supported by the non-root node's objective).

In some embodiments, change detection subsystem 114 may monitor modifications to a graph. As an example, during such monitoring, change detection subsystem 114 may perform a comparison between current versions of nodes of the hierarchical tree and immediately previous versions of the nodes may be performed for any nodes that have been detected as being modified (e.g., determined based on last modified times and the last time a check for modifications occurred). Such comparisons may be automatically performed on a periodic basis, in accordance with a schedule, or via other automated triggers (e.g., upon detection of a user saving a corresponding file, upon detection of a current version of the tree, a subset of the tree, or a node being replaced with an updated version during a data syncing process, etc.).

In some embodiments, with respect to a modified objective of a given node (or other modified definition of the given node), modification subsystem 116 may cause modification of a corresponding subset of a graph by (i) replacing the corresponding graph subset's nodes with one or more replacement nodes that each indicates an objective supporting the objective of the given node, (ii) replacing the corresponding graph subset's relationships with relationships between the replacement nodes, (iii) removing the corresponding graph subset's old nodes or relationships from the graph (or instance thereof) prior to, during, or subsequent the addition of the replacement nodes to the graph, or (iv) modifying the definitions of the old nodes or other aspects of the graph. In some embodiments, modification subsystem 116 may cause replacement of the subset of the graph that includes a child node of the given node and all of the child node's descendants by modifying the given node to no longer reference this child node and to instead reference a replacement node as the given node's child node. In some embodiments, modification subsystem 116 may cause replacement of the subset of the graph that includes all of the given node's descendants (e.g., all of its child nodes, all of its grandchild nodes, etc.) by modifying the given node to no longer reference any of the old child nodes and to instead reference one or more of the replacement nodes as the given node's child nodes. As an example, with respect to FIGS. 2C-2D, tree subset 240 may represent the result of modifying node 224 of a tree (e.g., a modified instance of tree 200) to dereference all child nodes of node 224. Tree subset 260 may include replacement nodes to replace the prior subset of the tree (with which tree subset 240 is at least a part) that included the dereferenced child nodes, and tree subset 260 may be added to tree subset 240 by modifying node 224 to reference nodes 226a-226n as child nodes of node 224.

In some embodiments, with respect to a modified objective of a given node of a graph, modification subsystem 116 may cause modification of a corresponding graph subset that includes child nodes of the given node, without regard to whether all (or any) of the child nodes have an unsatisfiable objective. As an example, even if a child node has a satisfiable objective with respect to the modified objective, the child node may still be replaced or removed responsive to the detection of the modification to the given node's objective. As a further example, the corresponding graph subset may include the child nodes and descendant nodes of the child nodes, and the child nodes and the descendant nodes may be replaced or removed without regard to whether all (or any) of the child nodes and the descendant nodes have an unsatisfiable objective. Thus, computational resource usage may be reduced by avoiding the assessment of at least one child or descendant node (or all the given node's child nodes) or not performing the assessment on any of the child nodes (that are nevertheless replaced or removed). As an example, when an objective indicated by a given node of a graph is determined to be modified (e.g., such that the objective no longer has a sufficiently similar meaning to the meaning of the pre-modified objective), it is likely that the objectives of most (or all) of the child nodes (as well as the objectives of the child nodes' descendants) no longer suitably support the given node's objective. For example, because the semantic meaning of the given node's objective has changed, the given node's objective (as modified) and the objectives of its descendant nodes oftentimes will not be semantically related. In this way, in many such circumstances, assessment of all of the objectives of the given node's descendants to see whether any of those objectives are still a "match" for the given node's objective (as modified) may not result any significant resource savings, and, thus, may be in some embodiments be avoided to improve the efficiency and speed of system 100.

In some embodiments, model subsystem 118 may utilize one or more prediction models (e.g., neural networks or other prediction models) to generate predictions related to one or more tasks, results of tasks, nodes, node relationships, graphs or subsets thereof, or other data. In some embodiments, model subsystem 118 may provide a collection of graphs (or other data) to a prediction model to train the prediction model to produce or select one or more tasks, results of tasks, nodes, node relationships, graphs or subsets thereof, or other data. In some embodiments, model subsystem 118 may analyze those predictions against a set of reference feedback, such as reference predictions of tasks, results of tasks, nodes, node relationships, or graphs or subsets thereof. In one use case, the reference outputs may be provided as input to the prediction model (e.g., prior to, simultaneously with, or subsequent to providing other input to the prediction model for the prediction model to process), which the prediction model may utilize to determine whether its predictions are accurate, determine the level of accuracy or completeness with respect to each prediction, or other make other determinations (e.g., via deep learning through its multiple layers of abstraction or other techniques). Such determinations may be utilized by the prediction model to improve the accuracy or completeness of its predictions. In another use case, accuracy or completeness indications with respect to the prediction model's predictions (e.g., whether a given prediction is accurate, how accurate or complete a given prediction is, etc.) may be provided to the prediction model, which, in turn, may utilize the accuracy or completeness indications to improve the accuracy or completeness of its mapping predictions.

As an example, model subsystem 118 may provide task data (indicating tasks provided to users), crowdsourced results of the tasks, a graph generated based on the crowdsourced results, or other data (e.g., voting data indicating user-selected results or ranking of the results) to a prediction model. In one use case, the prediction model may process the task data, and, based on the task data, predict the results of the tasks. The prediction model may then use the actual crowdsourced results for the tasks (e.g., results voted by users to be the best submissions or otherwise indicated as being of high quality by users) as reference feedback to assess its predicted results for the tasks. Based on its assessment of the predicted results, the prediction model may update one or more of its configurations. In a further use case, the prediction model may adjust its weights, biases, or other parameters so that, if the prediction model subsequently generated a prediction for the results based on the same task data processed for the initial prediction, the subsequent prediction would match the actual crowdsourced results (or their semantic meaning) for the tasks (or at least be more similar to the actual crowdsourced results than the initial prediction is to the actual crowdsourced results).

In another use case, the prediction model may process the crowdsourced results for tasks provided to users, and, based on such results, the prediction model may predict subsets of the results (e.g., that it predicts are deemed to be the highest quality results, the most favorite results, the highest ranked results, etc., by users). The prediction model may then use the actual voting data (e.g., indicating user-selected results or ranking of the results) as reference feedback to assess its predicted results subsets. Based on its assessment of the predicted results subsets, the prediction model may update one or more of its configurations. In a further use case, the prediction model may adjust its weights, biases, or other parameters so that, if the prediction model subsequently generated a prediction for the results subsets based on the same crowdsourced results processed for the initial prediction, the subsequent prediction would match the actual voting data (or at least be more similar to the actual voting data than the initial prediction is to the actual voting data).

In another use case, the prediction model may process the crowdsourced results for tasks and the voting data, and, based on the processed data, the prediction model may predict nodes or graphs reflecting the voting data and the crowdsourced results. The prediction model may then use the actual nodes or graphs (e.g., previously generated based on the voting data and the crowdsourced results) as reference feedback to assess its predicted nodes/graphs. Based on its assessment of the predicted nodes or graphs, the prediction model may update one or more of its configurations. In a further use case, the prediction model may adjust its weights, biases, or other parameters so that, if the prediction model subsequently generated a prediction for the nodes or graphs based on the same crowdsourced results and voting data processed for the initial prediction, the subsequent prediction would match the actual nodes or graphs (or at least be more similar to the actual nodes or graphs than the initial prediction is to the actual nodes or graphs).

In some embodiments, model subsystem 118 may provide task data, objective data, or other data to a prediction model (e.g., a neural network or other prediction model) to cause the prediction model to predict one or more graphs or subgraphs thereof. As an example, the task data may indicate one or more tasks (e.g., related to an objective) to be accomplished by one or more users. The objective data may indicate one or more objectives (e.g., related to the tasks). A graph or subgraph thereof predicted by the prediction model may include (i) a root node having a definition that indicates an objective (e.g., an objective indicated by the objective data or related to the tasks indicated by the task data), (ii) non-root nodes having definitions that indicate objectives that support the objective of the root node, (iii) leaf nodes having definitions that indicate objectives that support respective ones of the objectives of the non-root and non-leaf nodes, or (iv) other nodes, nodes, relationships, or other data.

In some embodiments, responsive to detection of a modification to an objective of a given node of a graph, model subsystem 118 may provide the modified objective to a prediction model (e.g., trained as described herein) to cause the prediction model to predict one or more graph subsets. Each of the graph subsets may include one or more nodes indicating satisfiable objectives with respect to the modified objective. In one use case, a satisfiable objective may include an objective that is compatible with the modified objective of the given node. In another use case, a satisfiable objective may include an objective supports the modified objective of the given node. To accommodate the modified objective of the given node, modification subsystem 116 may cause a subset of the graph (that includes one or more child nodes of the given node) to be modified based on one or more of the predicted graph subsets. As an example, modification subsystem 116 may select at least at least one of the predicted graph subsets and replace a subset of the graph (that includes a child node and the child node's descendants) with the selected predicted graph subsets.

In some embodiments, the prediction model may provide the predicted graph subsets by selecting nodes of the predicted graph subsets from a collection of previously-generated graphs based on the modified objective (provided to the prediction model). As an example, the graph collection may include graphs that were previously generated based on (i) results obtained for tasks (e.g., related to an objective), (ii) voting data (e.g., indicating user-selected results or ranking of the results), or (iii) other data. Each of the graphs may include (i) a first node (e.g., a root node or other node) having a definition that indicates an objective, (ii) non-root nodes having definitions that indicate objectives that support the first node's objective, (iii) leaf nodes having definitions that indicate objectives that support respective ones of the objectives of the non-root and non-leaf nodes, or (iv) other nodes, nodes, relationships, or other data. As such, if one or more graphs (or graph subsets) have previously been generated for the same or similar objective as the modified objective, the prediction model may identify such graphs and their respective nodes and node relationships as candidates for the modified objective.

In some embodiments, responsive to detection of a modification to an objective of a given node of a graph, sourcing subsystem 120 may generate one or more tasks requesting user input related to one or more objectives to support the modified objective. Based on the tasks (e.g., which are transmitted to users), sets of user inputs may be obtained as results for the tasks. Such results may indicate crowdsourced objectives that support the given node's modified objective. In one use case, with respect to the software development crowdsourcing example set forth above, one of the non-root nodes of the tree may be modified to change an objective of the non-root node. As an example, if the non-root node's objective is modified to indicate a different technical functionality, sourcing subsystem 120 may generate a task requesting that users provide more granular technical specifications or source code related to the different technical functionality. The highest quality or ranked results may be selected for use in modifying a subset of the graph (that includes one or more child nodes of the given node). For example, modification subsystem 116 may determine an objective corresponding to each of the selected results (e.g., via semantic extraction of the objective from a selected result), and use the objective provide a replacement node for the graph subset.

In some embodiments, model subsystem 118 may provide the modified objective (of the given node of the graph) to a prediction model (e.g., trained as described herein) to cause the prediction model to predict one or more graph subsets. Each of the graph subsets may include one or more nodes indicating satisfiable objectives with respect to the modified objective (e.g., where each of the nodes indicates an objective that supports the modified objective). Upon obtaining the crowdsourced results (e.g., the highest quality or ranked results), modification subsystem 116 may determine an objective corresponding to each of the results. If the crowdsourced results are deemed to be the quality results (e.g., via voting or other techniques), the corresponding objectives should support the modified objective. As such, modification subsystem 116 may determine similarities between the corresponding objectives and the objectives of nodes of the predicted graph subsets, and select replacement nodes for a subset of the graph (that includes one or more child nodes of the given node) based on the determined similarities.

Figure 2C:
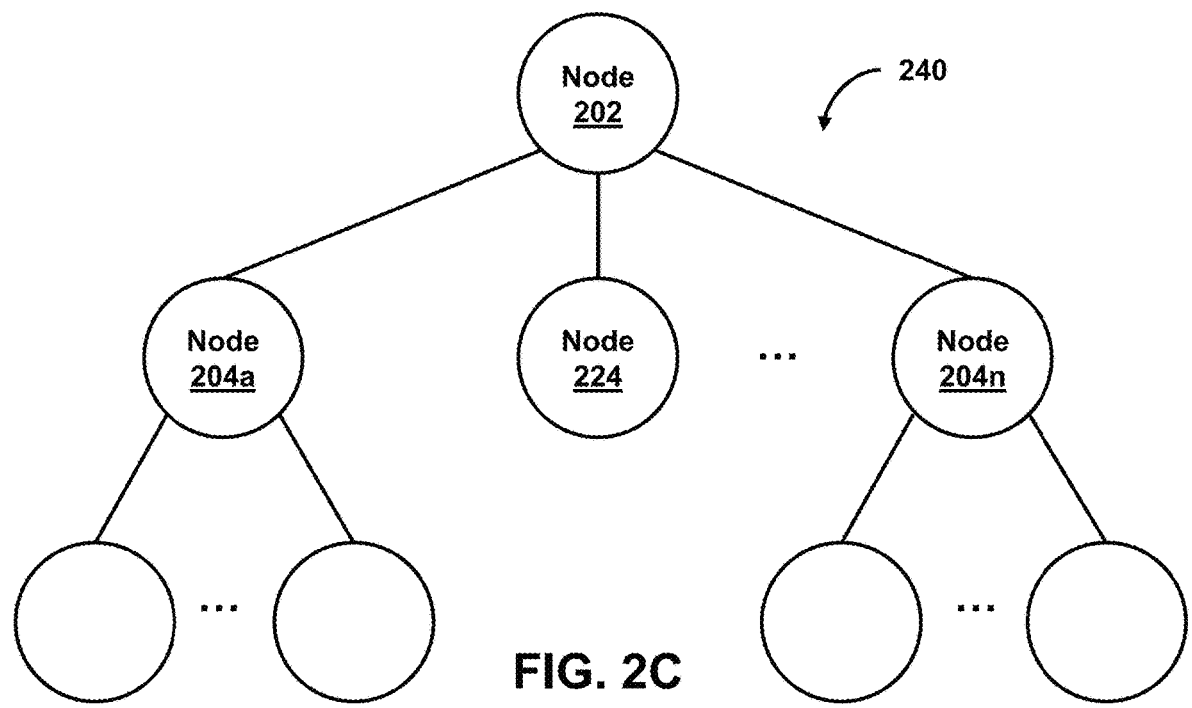
FIGS. 2C-2D respectively show a first tree subset with a modified node and a second tree subset that supplements the first tree subset, in accordance with one or more embodiments.
Figure 2D:
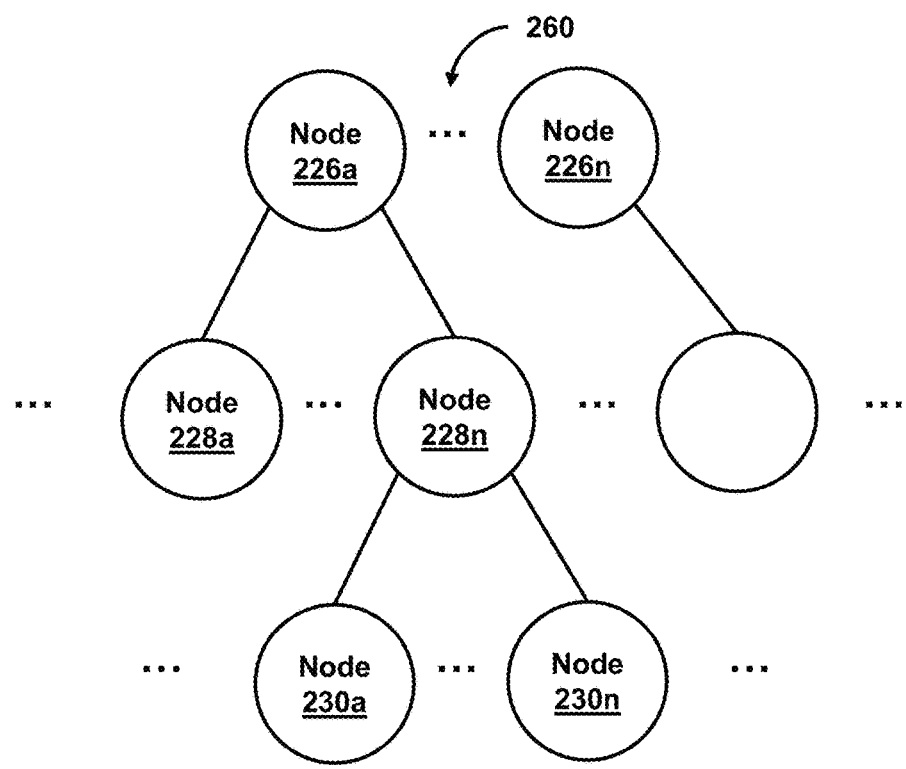

As an example, with respect to FIGS. 2C-2D, node 226a may be selected as a replacement node for a graph subset (that included descendants of node 224) based on a determination that an objective of node 226a having the greatest semantic similarity to a crowdsourced objective (e.g., determined to support the modified objective). As a result of the selection, modification subsystem 116 may add node 226a and its descendants (e.g., nodes 228 and 230) as descendants of node 224. As a further example, the descendant nodes of node 226a may be added as replacements for prior descendants of node 224 without performing one or more of the foregoing operations used to select node 226a (i.e., an ancestor of such descendant nodes) because the objectives of the replacement descendants already indicate satisfiable objectives with respect to node 226a (e.g., the objectives of the nodes 228 and 230 already support the objective of the node 226a). Thus, the generation of further tasks (e.g., creation tasks requesting user input related to one or more objectives to support the objective of node 226a, voting tasks to select or rank results of the tasks, atomize tasks related to identify which objectives need to be further expanded upon, etc.), the obtainment and processing of further results, the similarity determinations, or other operations used to select node 226a need not necessarily be subsequently sued to select the descendants of node 226 as replacement nodes for prior descendants of node 224. In this way, for example, the amount of computational resources to update a graph or graph subset in response to modification of one of its nodes may be significantly reduced. In addition, by avoiding one or more of the foregoing operations that require users to provide further results (e.g., to expand on one or more objectives), substantial delays may be eliminated (as compared to traditional crowdsourcing systems).

Examples Flowcharts

Figure 3:
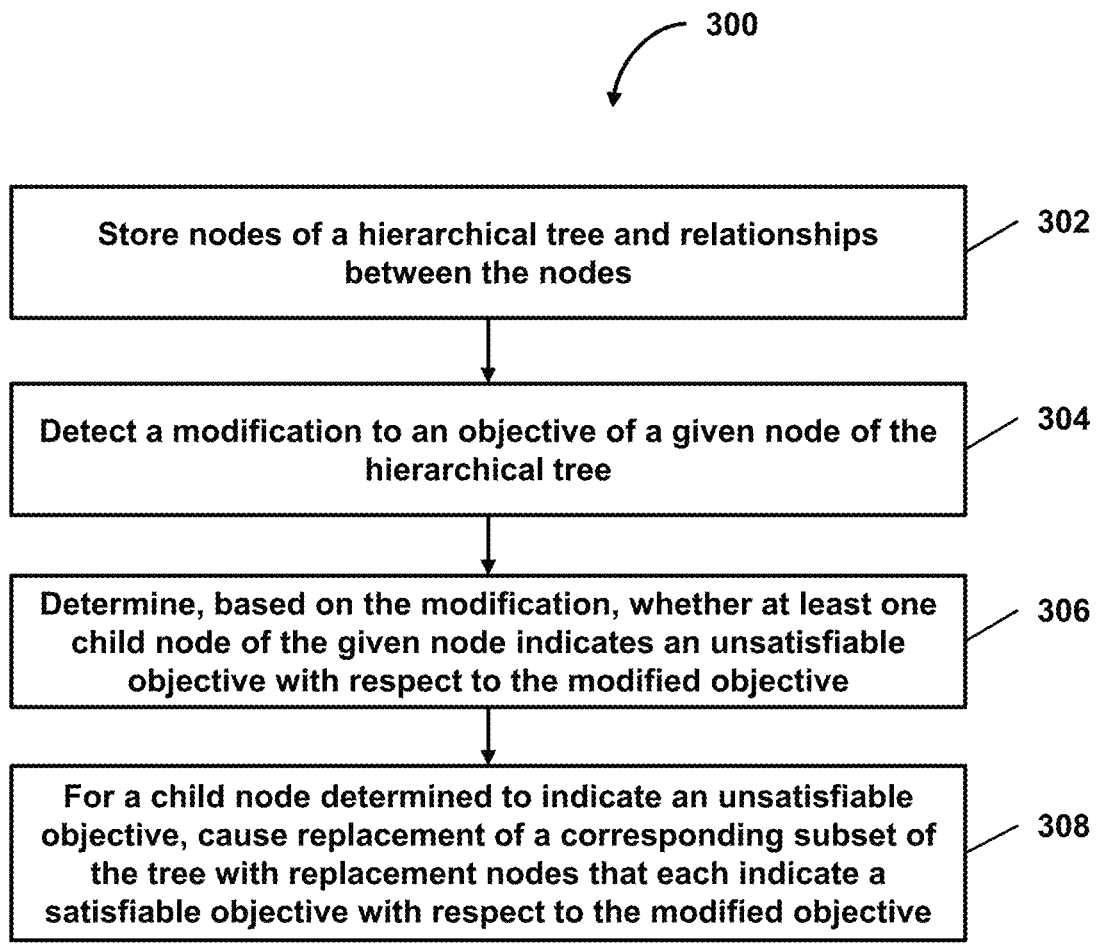
FIG. 3 shows a flowchart of a method of facilitating modification of an objective-oriented hierarchical tree, in accordance with one or more embodiments.
Figure 4:
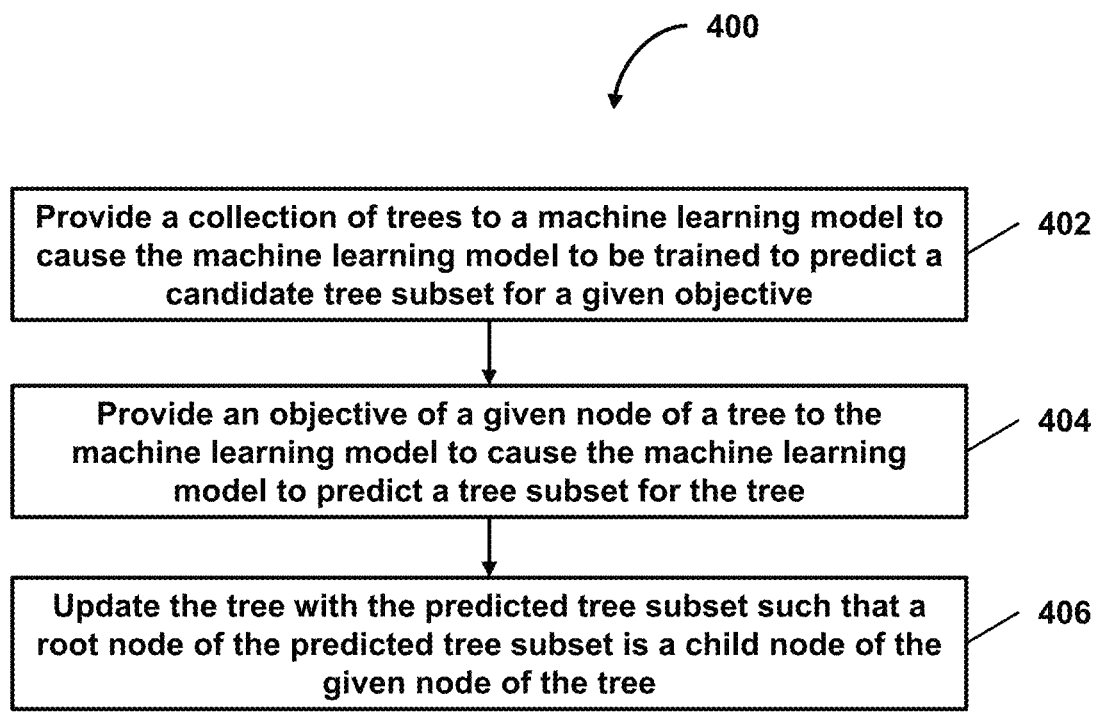
FIG. 4 shows a flowchart of a method of facilitating node-objective-based updating of a tree via a machine learning model, in accordance with one or more embodiments.

FIGS. 3-4 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method 300 of facilitating modification of an objective-oriented hierarchical tree, in accordance with one or more embodiments. In an operation 302, nodes of a hierarchical tree, relationships between the tree nodes, or other information related to the hierarchical tree may be stored. As an example, a node of the tree may include a definition that indicates an objective. A non-root node may include a definition indicating an objective that supports an objective of at least one node with which the non-root node has a direct relationship (e.g., the non-root node shares an edge with the node that indicates an objective supported by the objective of the non-root node). Operation 302 may be performed by a subsystem that is the same as or similar to data storage subsystem 112, in accordance with one or more embodiments.

In an operation 304, a modification to an objective of a given node of the hierarchical tree may be detected. As an example, a comparison between current versions of nodes of the hierarchical tree and immediately previous versions of the nodes may be performed for any nodes that have been detected as being modified (e.g., determined based on last modified times and the last time a check for modifications occurred). Such comparisons may be automatically performed on a periodic basis, in accordance with a schedule, or via other automated triggers (e.g., upon detection of a user saving a corresponding file, upon detection of a current version of the tree, a subset of the tree, or a node being replaced with an updated version during a data syncing process, etc.). Operation 304 may be performed by a subsystem that is the same as or similar to change detection subsystem 114, in accordance with one or more embodiments.

In an operation 306, based on the detected modification, a determination of whether at least one of the child nodes of the given node indicates an unsatisfiable objective with respect to the modified objective may be effectuated. As an example, an objective may be determined to be unsatisfiable (i) where the objective is determined to be incompatible with the given node's objective, (ii) where the objective is determined to no longer suitably support the given node's objective, or (iii) in other circumstances. Operation 306 may be performed by a subsystem that is the same as or similar to modification subsystem 116, in accordance with one or more embodiments.

In an operation 308, for a child node (of the hierarchical tree) determined to indicate an unsatisfiable objective (e.g., that no longer suitably supports the objective of the given node), a corresponding subset of the hierarchical tree may be replaced with replacement nodes. Each such replacement node may indicate a satisfiable objective with respect to the modified objective (e.g., such replacement node may indicate an objective suitably supporting the given node's objective). As an example, the corresponding subset of the hierarchical tree may include (i) the child node, (ii) one or more other child nodes of the given node, (iii) one or more descendant nodes of the child node or the other child nodes, or (iv) other nodes, edges, or aspects of the hierarchical tree. Operation 308 may be performed by a subsystem that is the same as or similar to modification subsystem 116, in accordance with one or more embodiments.

In some embodiments, with respect to operation 308, the corresponding subset includes the child node and the descendant nodes of the child node, and the replacement of the corresponding subset may be performed without regard to whether all (or any) of the descendant nodes have an unsatisfiable objective. As an example, even if a descendant node has a satisfiable objective with respect to the modified objective, the descendant node may still be replaced with a modified version (e.g., also having a satisfiable objective) or removed from the hierarchical tree (e.g., such that the child node of the given node no longer references the descendant node in the respective instance of the hierarchical tree subsequent to the replacement). As another example, the replacement of the corresponding subset (including the child node and grandchild nodes of the given node) may not be based on any determination of whether all (or any) of the grandchild nodes indicate a satisfiable objective.

In some embodiments, with respect to operation 308, the corresponding subset includes the child node and the other child nodes of the given node, and the replacement of the corresponding subset may be performed without regard to whether all (or any) of the other child nodes have an unsatisfiable objective. As an example, even if one of the other child nodes has a satisfiable objective with respect to the modified objective, this other child node may still be replaced with a modified version (e.g., also having a satisfiable objective) or removed from the hierarchical tree (e.g., such that the given node no longer references this other child node in the respective instance of the hierarchical tree subsequent to the replacement). As another example, the replacement of the corresponding subset (including the child node and the other child nodes) may not be based on any determination of whether all (or any) of the other child nodes indicate a satisfiable objective.

In some embodiments, with respect to operation 308, the corresponding subset includes the child node, the other child nodes of the given node, and the descendant nodes of the child node or the other child nodes, and the replacement of the corresponding subset may be performed without regard to whether all (or any) of the other child nodes and the descendant nodes have an unsatisfiable objective. As an example, even if one of the other child nodes or a descendant node has a satisfiable objective with respect to the modified objective, this other child node or descendant node may still be replaced with a modified version (e.g., also having a satisfiable objective) or removed from the hierarchical tree (e.g., such that the given node no longer references this other child node in the respective instance of the hierarchical tree, such that no node of the respective instance of the hierarchical tree references the descendant node, etc.).

FIG. 4 shows a flowchart of a method 400 of facilitating node-objective-based updating of a tree via a machine learning model, in accordance with one or more embodiments. In an operation 402, a collection of trees may be provided to a neural network to cause the machine learning model to be trained to predict a candidate tree subset for a given objective. As an example, the machine learning model may generate a prediction of a candidate tree subset such that a root node of the candidate tree subset indicates an objective supporting the given objective. Operation 402 may be performed by a subsystem that is the same as or similar to model subsystem 118, in accordance with one or more embodiments.

In an operation 404, an objective of a given node of a tree may be provided to the machine learning model to cause the machine learning model to predict a tree subset for the tree. As an example, the machine learning model may predict the tree subset for the tree based on one or more of its updated configurations (e.g., weights, biases, or other parameters) derived from its training on the collection of trees. Operation 404 may be performed by a subsystem that is the same as or similar to model subsystem 118, in accordance with one or more embodiments.

In an operation 406, the tree may be updated with the predicted tree subset. As an example, the tree may be updated such that a root node of the predicted tree subset is a child node of the given node (having the objective that was provided to the machine learning model). In one use case, the predicted tree subset may be added to the tree by directing connecting the root node of the predicted tree subset to the given node as a child node of the given node. In another use case, one or more child nodes (and/or one or more descendant nodes of the child nodes) may be removed from the tree, and the predicted tree subset may be added to the tree to replace the corresponding removed tree subset. Operation 406 may be performed by a subsystem that is the same as or similar to modification subsystem 116, in accordance with one or more embodiments.

In some embodiments, the various computers and subsystems illustrated in FIG. 1 may include one or more computing devices that are programmed to perform the functions described herein. The computing devices may include one or more electronic storages (e.g., data structure database(s) 132, training data database(s) 134, model database(s) 136, or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112-120 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: storing nodes of a graph and relationships between the nodes, detecting a modification to an objective of a given node of the nodes; and causing replacement of a subset of the graph with replacement nodes, wherein the subset of the graph corresponds to a child node of the given node, wherein the corresponding subset of the graph comprising (i) the child node and (ii) one or more descendant nodes of the child node, and wherein each of the replacement nodes indicates an objective supporting the objective of the given node.

2. The method of embodiment 1, further comprising: determining, based on the detected modification, child nodes of the given node and whether at least one of the child nodes of the given node indicates an unsatisfiable objective with respect to the modified objective; and, for a child node of the child nodes determined to indicate an unsatisfiable objective with respect to the modified objective.

3. The method of any of embodiments 1-2, wherein the child node is determined to indicate an unsatisfiable objective based on a determination that the objective of the child node no longer suitably supports the objective of the given node.

4. The method of any of embodiments 1-3, wherein each of the nodes indicates an objective, and wherein each non-root node of the nodes indicates an objective supporting an objective of at least one node with which the non-root node has a direct relationship.

5. The method of any of embodiments 1-4, wherein the replacement of the corresponding subset of the graph is not based on any determination of whether grandchild nodes of the given node indicate an objective that suitably supports the objective of the given node.

6. The method of any of embodiments 1-5, wherein the corresponding subset of the graph comprises (i) the child node of the given node, (ii) the one or more descendant nodes of the child node, and (iii) other child nodes of the given node.

7. The method of embodiment 6, wherein causing the replacement of the corresponding subset of the graph comprises causing the replacement of the corresponding subset without regard to whether all of the other child nodes of the given node indicate an unsatisfiable objective.

8. The method of any of embodiments 1-7, further comprising: providing a collection of graphs as input to a prediction model to cause the prediction model to be trained to predict a candidate graph subset for a given objective such that a root node of the candidate graph subset indicates an objective that supports the given objective; and providing the modified objective to the prediction model to cause the prediction model to predict a given graph subset comprising the replacement nodes, wherein causing the replacement of the corresponding subset of the graph comprises causing the corresponding subset of the graph to be replaced with the given graph subset predicted by the prediction model.

9. The method of embodiment 8, wherein the given graph subset is at least a subset of a previously-generated graph stored in one or more databases.

10. The method of any of embodiments 8-9, wherein the prediction model outputs a prediction of the given graph subset and one or more other graph subsets based on the modified objective, the method further comprising: selecting the given graph subset over the one or more other graph subsets to replace the corresponding subset of the graph based on a root node of the given graph subset indicating an objective similar to at least one reference objective.

11. The method of embodiment 10, further comprising: generating a task requesting user input related to one or more objectives to support the objective of the given node; obtaining, based on the task, sets of user inputs indicating crowd-sourced objectives; and selecting, from the sets of user inputs, one or more crowd-sourced objectives to be one or more reference objectives, the at least one reference objective being at least one crowd-sourced objective of the one or more crowd-sourced objectives, wherein selecting the given graph subset to replace the corresponding subset of the graph comprises selecting the given graph subset based on the objective of the root node of the given graph subset being similar to the at least one crowd-sourced objective.

12. The method of any of embodiments 1-11, further comprising: generating a task requesting user input related to one or more objectives to support the objective of the given node; obtaining, based on the task, sets of user inputs indicating crowd-sourced objectives; and selecting, from the sets of user inputs, one or more crowd-sourced objectives to indicated in the replacement nodes, wherein causing the replacement of the corresponding subset of the graph comprises causing the replacement of the corresponding subset with one or more nodes indicating the one or more crowd-sourced objectives.

13. A tangible, non-transitory, machine-readable medium storing instructions that when executed by a data processing apparatus cause the data processing apparatus to perform operations comprising those of any of embodiments 1-12.

14. A system comprising: one or more processors; and memory storing instructions that when executed by the processors cause the processors to effectuate operations comprising those of any of embodiments 1-12.

What is claimed is:

1. A system for facilitating data structure modification of an objective-oriented hierarchical tree, comprising:
a computer system that comprises one or more processors programmed with computer program instructions that, when executed, cause the computer system to:
store tree nodes of a hierarchical tree and relationships between the tree nodes, each of the tree nodes indicating an objective, each non-root node of the tree nodes indicating an objective supporting an objective of at least one node with which the non-root node has a direct relationship;
detect a modification to an objective of a given node of the tree nodes;
determine, based on the detected modification, child nodes of the given node and whether at least one of the child nodes of the given node indicates an objective that no longer suitably supports the objective of the given node; and
for a child node of the child nodes determined to indicate an objective that no longer suitably supports the objective of the given node, replace a corresponding subset of the hierarchical tree with replacement nodes that each indicates an objective suitably supporting the objective of the given node, the corresponding subset of the hierarchical tree comprising (i) the child node and (ii) one or more descendant nodes of the child node, wherein the replacement of the corresponding subset of the hierarchical tree comprises:
generating a task requesting user input related to one or more objectives to support the objective of the given node;
obtaining, based on the task, sets of user inputs indicating crowd-sourced objectives;
selecting, from the sets of user inputs, one or more crowd-sourced objectives to be one or more reference objectives; and
selecting a given tree subset over one or more other tree subsets to replace the corresponding subset of the hierarchical tree based on a root node of the given tree subset indicating an objective similar to at least one crowd-sourced objective of the one or more crowd-sourced objectives.

2. The system of claim 1, wherein the replacement of the corresponding subset of the hierarchical tree is not based on any determination of whether grandchild nodes of the given node indicate an objective that suitably supports the objective of the given node.

3. The system of claim 1, wherein the computer system is caused to:
provide a collection of hierarchical trees as input to a neural network to cause the neural network to be trained to predict a candidate tree subset for a given objective such that a root node of the candidate tree subset indicates an objective that supports the given objective; and
prior to the selection of the given tree subset, provide the modified objective to the neural network to cause the neural network to predict (i) the given tree subset comprising the replacement nodes and (ii) the one or more other tree subsets.

4. The system of claim 3, wherein the given tree subset is at least a subset of a previously-generated hierarchical tree stored in one or more databases.

5. The system of claim 3, wherein the neural network outputs a prediction of the given tree subset and the one or more other tree subsets based on the modified objective.

6. The system of claim 1, wherein the corresponding subset of the hierarchical tree comprises (i) the child node of the given node, (ii) the one or more descendant nodes of the child node, and (iii) other child nodes of the given node.

7. The system of claim 6, wherein the replacement of the corresponding subset of the hierarchical tree comprises causing the replacement of the corresponding subset without regard to whether all of the other child nodes of the given node indicate an objective that no longer suitably supports the objective of the given node.

8. A method implemented by a computer system that comprises one or more processors executing computer program instructions for facilitating data structure modification of an objective-oriented hierarchical tree that, the method comprising:
    storing tree nodes of a hierarchical tree and relationships between the tree nodes, each of the tree nodes indicating an objective, each non-root node of the tree nodes indicating an objective supporting an objective of at least one node with which the non-root node has a direct relationship;
    detecting a modification to an objective of a given node of the tree nodes;
    determining, based on the detected modification, child nodes of the given node and whether at least one of the child nodes of the given node indicates an objective that no longer suitably supports the objective of the given node; and
    for a child node of the child nodes determined to indicate an objective that no longer suitably supports the objective of the given node, replace a corresponding subset of the hierarchical tree with replacement nodes that each indicates an objective suitably supporting the objective of the given node, the corresponding subset of the hierarchical tree comprising (i) the child node and (ii) one or more descendant nodes of the child node, wherein the replacement of the corresponding subset of the hierarchical tree comprises:
    generating a task requesting user input related to one or more objectives to support the objective of the given node;
    obtaining, based on the task, sets of user inputs indicating crowd-sourced objectives;
    selecting, from the sets of user inputs, one or more crowd-sourced objectives to be one or more reference objectives; and
    selecting a given tree subset over one or more other tree subsets to replace the corresponding subset of the hierarchical tree based on a root node of the given tree subset indicating an objective similar to at least one crowd-sourced objective of the one or more crowd-sourced objectives.

9. The method of claim 8, wherein the replacement of the corresponding subset of the hierarchical tree is not based on any determination of whether grandchild nodes of the given node indicate an objective that suitably supports the objective of the given node.

10. The method of claim 8, further comprising:
    providing a collection of hierarchical trees as input to a prediction model to cause the prediction model to be trained to predict a candidate tree subset for a given objective such that a root node of the candidate tree subset indicates an objective that supports the given objective; and
    prior to the selection of the given tree subset, providing the modified objective to the prediction model to cause the prediction model to predict (i) the given tree subset comprising the replacement nodes and (ii) the one or more other tree subsets.

11. The method of claim 10, wherein the given tree subset is at least a subset of a previously-generated hierarchical tree stored in one or more databases.

12. The method of claim 10, wherein the prediction model outputs a prediction of the given tree subset and the one or more other tree subsets based on the modified objective.

13. The method of claim 8, wherein the corresponding subset of the hierarchical tree comprises (i) the child node of the given node, (ii) the one or more descendant nodes of the child node, and (iii) other child nodes of the given node.

14. The method of claim 13, wherein the replacement of the corresponding subset of the hierarchical tree comprises causing the replacement of the corresponding subset without regard to whether all of the other child nodes of the given node indicate an objective that no longer suitably supports the objective of the given node.

15. One or more non-transitory computer-readable media storing instructions that, when executed by one or more processors, cause operations for facilitating data structure modification of an objective-oriented hierarchical tree, comprising:
    storing tree nodes of a hierarchical tree and relationships between the tree nodes, each of the tree nodes indicating an objective, each non-root node of the tree nodes indicating an objective supporting an objective of at least one node with which the non-root node has a direct relationship;
    detecting a modification to an objective of a given node of the tree nodes;
    determining, based on the detected modification, child nodes of the given node and whether at least one of the child nodes of the given node indicates an objective that no longer suitably supports the objective of the given node; and
    for a child node of the child nodes determined to indicate an objective that no longer suitably supports the objective of the given node, replace a corresponding subset of the hierarchical tree with replacement nodes that each indicates an objective suitably supporting the objective of the given node, the corresponding subset of the hierarchical tree comprising (i) the child node and (ii) one or more descendant nodes of the child node, wherein the replacement of the corresponding subset of the hierarchical tree comprises:
    generating a task requesting user input related to one or more objectives to support the objective of the given node;
    obtaining, based on the task, sets of user inputs indicating crowd-sourced objectives;
    selecting, from the sets of user inputs, one or more crowd-sourced objectives to be one or more reference objectives; and
    selecting a given tree subset over one or more other tree subsets to replace the corresponding subset of the hierarchical tree based on a root node of the given tree subset indicating an objective similar to at least one crowd-sourced objective of the one or more crowd-sourced objectives.

16. The media of claim 15, wherein the replacement of the corresponding subset of the hierarchical tree is not based on any determination of whether grandchild nodes of the given node indicate an objective that suitably supports the objective of the given node.

17. The media of claim 15, the operations further comprising:
   providing a collection of hierarchical trees as input to a prediction model to cause the prediction model to be trained to predict a candidate tree subset for a given objective such that a root node of the candidate tree subset indicates an objective that supports the given objective; and
   prior to the selection of the given tree subset, providing the modified objective to the prediction model to cause the prediction model to predict the given tree subset comprising the replacement nodes and (ii) the one or more other tree subsets.

18. The media of claim 17, wherein the given tree subset is at least a subset of a previously-generated hierarchical tree stored in one or more databases.

19. The media of claim 17, wherein the prediction model outputs a prediction of the given tree subset and the one or more other tree subsets based on the modified objective.

20. The media of claim 15, wherein the corresponding subset of the hierarchical tree comprises (i) the child node of the given node, (ii) the one or more descendant nodes of the child node, and (iii) other child nodes of the given node.

* * * * *